(12) United States Patent
Sternberg

(10) Patent No.: US 10,264,741 B2
(45) Date of Patent: Apr. 23, 2019

(54) SUB-SURFACE IRRIGATION SYSTEM

(71) Applicant: Capillary Concrete AB, Askim (SE)

(72) Inventor: Martin Sternberg, Göteborg (SE)

(73) Assignee: Capillary Concrete AB, Askim (SE)

( * ) Notice: Subject to any disclaimer, the term of this patent is extended or adjusted under 35 U.S.C. 154(b) by 111 days.

(21) Appl. No.: 15/281,241

(22) Filed: Sep. 30, 2016

(65) Prior Publication Data

US 2017/0094919 A1 Apr. 6, 2017

Related U.S. Application Data

(60) Provisional application No. 62/236,174, filed on Oct. 2, 2015.

(51) Int. Cl.
| | |
|---|---|
| *A01G 25/06* | (2006.01) |
| *A01G 25/16* | (2006.01) |
| *A01G 22/00* | (2018.01) |
| *A01G 25/02* | (2006.01) |
| A01G 25/00 | (2006.01) |

(52) U.S. Cl.
CPC ............ *A01G 25/167* (2013.01); *A01G 22/00* (2018.02); *A01G 25/023* (2013.01); *A01G 25/06* (2013.01); *A01G 2025/003* (2013.01)

(58) Field of Classification Search
CPC ....... A01G 25/06; A01G 25/16; A01G 25/167
USPC ........................................................ 47/48.5
See application file for complete search history.

(56) References Cited

U.S. PATENT DOCUMENTS

| | | | | | |
|---|---|---|---|---|---|
| 4,576,511 | A | * | 3/1986 | Vidal, Jr. ................ | E01C 13/06 405/37 |
| 4,878,780 | A | * | 11/1989 | Vidal ...................... | E01C 13/02 405/38 |
| 5,590,980 | A | * | 1/1997 | Daniel .................... | A01G 25/06 405/36 |
| 5,938,372 | A | * | 8/1999 | Lichfield ................ | A01G 25/06 405/36 |
| 5,944,444 | A | * | 8/1999 | Motz ..................... | E01C 13/083 137/561 R |

(Continued)

FOREIGN PATENT DOCUMENTS

| | | |
|---|---|---|
| FR | 2556381 | 6/1985 |
| JP | H08302800 | 11/1996 |

(Continued)

OTHER PUBLICATIONS

Arnaud Benedetti; International Search Report/Written Opinion, counterpart international application No. PCT/EP2016/073458, dated Dec. 19, 2016, European Patent Office, Rijswijk, NL.

*Primary Examiner* — Monica L Williams
*Assistant Examiner* — Aaron M Rodziwicz
(74) *Attorney, Agent, or Firm* — Babcock IP, PLLC

(57) ABSTRACT

A system for controlling a moisture content below a surface area, where the system is installable in a recess above which the surface area will be located. The system comprises a substantially water impermeable first layer, a porous second layer and a water control basin which comprises means for controlling a moisture level of the porous second layer. The system enables liquid from the water control basin to be transported through the second layer by utilization of capillary forces, providing for an efficient sub-surface irrigation system which is easy to maintain. A method for providing such an irrigation system is also disclosed.

12 Claims, 4 Drawing Sheets

(56) References Cited

U.S. PATENT DOCUMENTS

| | | | | | |
|---|---|---|---|---|---|
| 6,095,718 | A | * | 8/2000 | Bohnhoff | E02B 11/00 405/52 |
| 6,419,422 | B1 | * | 7/2002 | Wachtel | A01G 25/06 165/45 |
| 7,638,065 | B2 | * | 12/2009 | Stever | B01D 21/0012 210/747.3 |
| 7,866,918 | B2 | * | 1/2011 | Otto | E01C 13/02 405/302.7 |
| 2004/0005193 | A1 | * | 1/2004 | Mazzei | A01G 25/06 405/43 |
| 2012/0216457 | A1 | * | 8/2012 | Robb | A01G 25/06 47/48.5 |
| 2013/0183097 | A1 | * | 7/2013 | Scantling | A01G 25/06 405/43 |
| 2016/0073596 | A1 | * | 3/2016 | Pals | A01G 25/06 405/42 |
| 2016/0295817 | A1 | * | 10/2016 | Pujadas | A01G 25/06 |

FOREIGN PATENT DOCUMENTS

| | | |
|---|---|---|
| JP | 3253231 | 2/2002 |
| WO | 85/00631 | 2/1985 |
| WO | 2012/036612 | 3/2012 |

\* cited by examiner

SUB-SURFACE IRRIGATION SYSTEM

FIELD OF THE INVENTION

The present invention relates to an irrigation system for a surface area. More specifically the present invention relates to a system for controlling irrigation of a surface area by utilization of capillary forces.

BACKGROUND OF THE INVENTION

Irrigation systems and irrigation methods have been under constant development for thousands of years, efficient water management has many times been an overall goal when new systems and methods have been introduced. The introduction of diesel and electric motors has enabled many new concepts when it comes to irrigation (or watering) of planted surfaces and advancements in terms of reduction in manual labor and costs have been made. There is a constantly growing need for better irrigation systems and irrigation methods in order to maximize water use efficiency, i.e. supplying each plant with the amount of water it needs, no more and no less, and at the same time minimizing water losses, e.g. due to evaporation.

This is particularly important in areas which are subjected to severe drought periods, as a consequence these areas often have strict water rationing. Moreover, in consideration of recent developments around the world, i.e. rapidly increasing population, the overall economical growth, climate changes and so on, irrigation water (ground water, surface water, etc.) is becoming a less abundant resource which puts high demands on irrigation techniques to maximize efficiency as irrigation water may not be considered an "unlimited resource" like it was just half a century ago.

There are several types of irrigation techniques, such as e.g. furrow, flood, sprinkler, spray, subsurface, drip, etc. each with their own advantages and disadvantages. When it comes to maximizing water efficiency one can generally say that sub-surface irrigation systems are preferable over surface irrigation systems (e.g. sprinklers, level basins, etc.), they are however often more expensive to install and/or maintain.

Furthermore, it has been shown that plant roots tend to grow in the direction of the moisture gradient, thus if the moisture level is kept higher below the roots than at a surface level, the plants (or vegetation) will develop a deeper root system which will result in very stable and durable plants in contrast to plants which have developed a rather shallow root system due to surface irrigation.

It is known in the art to provide sub-surface irrigation system in which apertured tubes/pipes or tubes with drippers/emitters are utilized to distribute water at predetermined positions. Examples of such system can be found e.g. in U.S. Pat. No. 5,590,980 and US 2008/0098652.

However, systems like these are often very complicated and costly, and furthermore pose great challenges when trying to achieve a completely uniform spread of water across a large area. Moreover, they often require significant lengths of pipes or tubes which may be troublesome when it comes to maintenance and repairs.

There is therefore a need for an improved method and system for subsurface irrigation or watering of planted surfaces, which allows for good water use efficiency, easy maintenance and at the same time improves cost-efficiency.

SUMMARY

It is therefore an object of the present invention to provide an irrigation system and a method for providing a sub-surface irrigation system, which alleviates all or at least some of the above-discussed drawbacks of the presently known systems.

It is to be understood that in the context of the present application, the term exemplary is to be interpreted as serving as an example, instance or illustration.

This object is achieved by means of a system and a method for providing a sub-surface irrigation system as defined in the appended claims.

According to a first aspect of the present invention, there is provided an irrigation system for controlling a moisture content below a surface area, said system being installable in a recess above which said surface area will be located, wherein said system comprises:

a substantially water impermeable first layer for preventing water from escaping a volume defined by the recess;

a porous second layer being spread out on top of the first layer;

a water control basin comprising means for controlling a moisture level of the second layer;

wherein liquid from the water control basin is transported through said second layer by capillary forces towards a third layer of rooting medium located on top of said second layer.

The irrigation system accordingly allows for efficient subsurface irrigation by having the porous second layer efficiently and evenly spreading the liquid (e.g. water or fertilized water) across a large surface and up towards the roots of vegetation which are planted in a third layer of rooting medium (e.g. soil or sand), located above the porous layer by the use of capillary forces. Hence, the invention reduces the need of excessive piping/pipe-laying across large areas and also the need of using excessive energy to operate pumps. In the following the invention will mainly be in reference to water as the liquid utilized in the irrigation system, this is however not intended to limit the present invention in any way; the skilled person will understand that the inventive concept is readily applicable with any type of equivalent liquid useable to aid or help the growth of land or crops.

The present invention is based on the realization that if one were to position a uniformly spread layer of a porous material beneath a field area, such as e.g. a grass turf, golf-green, teeing ground, lawn, sports arena, etc., and utilize capillary forces, then one could provide a very efficient and simple subsurface irrigation system. The porous material may for example be a mixture of cement and particulate stone material such as e.g. Capillary Concrete™, which is commercially available by the applicant, Capillary Concrete AB of Molndal Sweden and described in the PCT-application WO 2012/036612 made by the applicant, incorporated herein by reference. The porous material layer can then be put in direct contact with a water control basin, e.g. a well or container, which can control the level of moisture in the porous material layer by either adding or removing the water from the basin. The water may be in direct contact with the porous material, or at least in fluid communication with the porous material (e.g. via a conduit), by the aid of a pump or any equivalent device.

Furthermore the inventors realized that if the recess/excavated hole in the ground, into which the irrigation system is to be positioned, is lined with a first layer/membrane of water impermeable material, such as e.g. plastic, onto which the porous layer is subsequently poured or positioned, then not only is proper isolation from the surrounding soil achieved, but also water originating from natural occurrences (e.g. rain, or snow) may be collected and utilized in a more efficient manner by the aid of the water control basin and the porous layer. For example, if the moisture level would be determined to be too high (in reference to a predetermined level), e.g. after some rain, then the water would be kept within the water impermeable lining which would eventually cause the water level in the water basin to rise and/or increase the detected moisture level in the porous layer, which may trigger a pump to remove some of the water in the basin in order to lower the moisture level of the porous layer and consequently maintain a sufficient amount of water transported to the above vegetation (e.g. grass) in order to reduce the risk of flooding the vegetation. Alternatively, or in addition to removing water by means of a pump, the water basin may be provided with exit holes or an exit pipe arranged at a suitable position within the water control basin. For example, one or more exit holes/pipes may be arranged at a predetermined height whereby a predetermined maximum water level may be maintained. Thus, when the water level exceeds the predetermined maximum the water will simply exit from the water control basin through the exit hole(s)/exit pipe(s). The exit hole(s)/pipe(s) may be configured to be remotely controllable, e.g. by arranging a motor in mechanical engagement with a control arm which determines the position of an exit pipe.

Further, it is to be understood that the lining with a water impermeable material does not only involve lining the bottom surface, but also may involve lining the "walls" of the intended volume into which the irrigation system is to be installed, e.g. the walls of the recess, thereby preventing fluid or water from escaping through the "side walls" as well, i.e. the volume (bottom and sides) defined by the recess. The first layer will not prevent water to escape upwards, e.g. due to evaporation, however technicalities like these are assumed to be obvious for the skilled artisan. Even though no perforated pipes or tubes are needed in order to achieve the desired effect of irrigating a large surface area, the sub-surface irrigation system of the present invention may comprise at least one perforated pipe within or directly below the porous layer (but above the water-impermeable layer), in order to speed up the irrigation/aerification of the above lying particle size fraction (e.g. soil or sand). The perforated pipe may be a single pipe placed within or below the porous layer, or it may be a grid of perforated pipes placed within or below the porous layer.

Thus, the irrigation (or watering) system according to the inventive concept provides a very versatile and simple way to accurately control the moisture level of the root system of a planted surface, such as e.g. a putting green on a golf course. The rain water which was removed from the water basin could be stored at some other location in e.g. a reservoir or similar, and re-introduced in the water basin at a later time if the moisture level would be determined to be too low. The water basin may however alternatively or in addition have a separate compartment in which excess/back-up liquid is stored.

Even further, it is to be understood that even though most references are made to recesses and excavated holes in the ground the inventive system is readily applicable to other equivalent purposes as well, e.g. if one is to make a cast above ground, e.g. above ground planters or raised garden beds, and provide the system into these casts. Furthermore, the references made to a recess or hole in the ground is intended to be a descriptive term of the appearance of the area before the system is installed, meaning that once the system is installed the recess or hole will no longer be visible.

According to one exemplary embodiment the porous second layer is a mixture comprising cement and particulate material. The mixture may then be mixed with a predetermined amount of water in order to form a second mixture which can be poured on top the first water impermeable layer. This facilitates the application and spreading of the porous layer onto a surface of a desired area. The second mixture is to be allowed to cure or set after it has been applied to the first layer which will result in a porous layer which allows water to flow through the cured layer. The particulate material may be any particulate material useable as a construction aggregate, such as e.g. particulate stone material, crushed stone, gravel, slag, ceramics, plastics, metal, glass or clay. An example of clay aggregate is LECA (Light Expanded Clay Aggregate) balls.

This exemplary embodiment is advantageous, since the second mixture will form a strong and porous (cured) layer, which is draining and allows thus water to flow through it. Consequently, the risk for water accumulation on the surface of the planted area is decreased, which may be very inconvenient if the planted area is e.g. a sports area. Further, the cured layer (i.e. the second mixture after curing) may be exposed to water during long periods, for instance due to rain, without giving rise to the usual problems associated with cracking since the cured layer won't shift even if it cracks, thus still providing a stable foundation for any planted surface. In addition, the system (and method) according to the present invention facilitates foundation of sports areas, increases the lifetime of sports areas and is more cost efficient than prior art methods, at least in relation to amount of labor needed for installation and material.

Curing or setting is intended to have its ordinary meaning in the context, in other words, the process where the layer of the second mixture hardens due to chemical reactions in the layer.

In another exemplary embodiment the water control basin comprises a pump for addition and/or removal of liquid into/from said water control basin. This facilitates the controlling of the moisture level of the porous layer, and if it were to be combined with at least one sensor for detecting the moisture level, the irrigation system could be fully automated. The one or more sensors may either be one or more sensors/gauges that monitor(s) and detect(s) a water level within the water basin or it could be one or more sensors that detect(s) the moisture level within the porous layer or the above layer of soil/sand at one or several locations.

In the example where at least one sensor/gauge is used to monitor and detect a water level within the water basin, the system may be constructed/arranged so that at least one portion of the porous layer is in direct contact with the water, thus an increased water level would cover more of the porous layer in water and effectively increase the moisture level in the porous layer and subsequently also in the above rooting medium (e.g. soil or sand). So, if the water level sensor would detect a water level that is too high in reference to a predetermined value, this data/information may be sent to an operator or computer which then may activate the pump to remove some of the water in the water basin in order to lower the water level and effectively lower the moisture level in the porous layer and the above soil/sand layer.

In yet another exemplary embodiment at least one portion of the porous second layer is in fluid communication with a liquid present in said water control basin. This allows for the spreading of liquid, e.g. water, by the use of capillary forces in the porous layer in a cost-effective and simple manner. By keeping a portion of the porous layer continuously in fluid communication with water or direct contact (immersed in water), the water may be spread towards the above soil/sand layer and the associated plant roots, thus reducing the need of excessive piping with perforated or aperture tubes as the transport of water is done by the porous layer itself. Fluid communication in this context can be understood as that the water control basin is spaced apart from the porous layer but that there is some pipe connecting the water control basin and a portion of the porous layer so that fluid is free to flow between this portion of the porous layer and the water control basin. Meaning that the water control basin may be located outside the volume defined by the water-impermeable layer but still able to deliver fluid to the porous layer through the water-impermeable layer through a pipe.

According to another exemplary embodiment the water control basin is located at a peripheral edge of the recess and adjacent to a side-wall of said recess, said side-wall being covered with said water-impermeable first layer. By having the water control basin located near the periphery of the intended irrigation area, the maintenance of the water control basin may be facilitated and minimal interference with the (planted) surface area(s) may be achieved. For example if the intended irrigation area is a golf green or teeing ground, an operator can repair and check the water control basin and associated parts without ever stepping out on the golf green or teeing ground. Moreover, placement of the water control basin at a peripheral edge is also aesthetically beneficial as the planted surface may be provided without any unnatural parts, in contrast to if a sprinkler system was used and one was forced to install sprinkler nozzles at various locations all over the surface area.

In another exemplary embodiment the water control basin comprises an opening accessible from a surface level. This further facilitates the maintenance/monitoring and repair of the irrigation system as an operator or a user may easily access the water control basin without being forced to dig a hole in the ground. Since the irrigation system according to the invention may be constructed without any piping other than pipes or tubes to and from the water control basin all usual maintenance and/or repairs is performed solely in or in the vicinity of the water control basin (pipes or tubes leading to and from the water control basin may be prone to maintenance but are however not a part of the inventive system). The water control basin may further comprise valves, gauges, and other common parts associated with the controlling of an irrigation system, control and monitoring of the water level or humidity level may however also be performed from a remote location.

According to another exemplary embodiment the water control basin comprises an air-tight seal to said opening. The aforementioned opening of the water control basin which is accessible from a ground level is preferably provided with a lid or cover. This lid may further be provided with a piece of turf, or similar, in order to camouflage the opening. Moreover, the lid/seal/cover may also be air-tight, this is useful when an operator or user wants to drain the soil of the planted surface. By having an air tight seal and operating a pump (e.g. vacuum pump) to drain water and air from the water control basin it will consequently lead to water and air being drained from the porous layer and also the overlying soil/sand. The draining of liquid and air is particularly useful in order to preserve the vegetation during low ambient temperatures, e.g. during winter, by draining all of the water and air from the soil/sand it is made much more resistant to sub-zero temperatures and thus the associated grass/plants/crops may be kept for longer periods of time i.e. reducing the need of replanting.

In another exemplary embodiment, at least one portion of said porous second layer further comprises at least one drip line. A drip line may be installed in, right underneath or right above the porous layer in order to further facilitate the spreading of liquid throughout the entire surface/volume of the porous layer i.e. aid the irrigation. The drip line may also be used for airification. In particular this may be useful when the porous layer cannot be placed on a perfectly horizontal location but instead has at least one portion which is located at a vertically higher level than at least one second portion of said porous second layer. In these situations/locations the capillary forces might not be strong enough to overcome the gravitational force and to transport water to all parts of the porous layer, for example if the surface that the recess into which the porous layer is to be positioned has an uneven surface with protrusions/crests. Then one or several drip lines may be installed at these protrusions/crests in order to ensure that water is transported to the soil/sand and subsequently the roots of the vegetations in the soil/sand located above the protrusions/crests.

According to another aspect of the present invention, there is provided a method providing a sub-surface irrigation system, said method comprising the steps of:
  providing a substantially water impermeable first layer;
  providing a porous second layer on top of the first layer;
  providing a water control basin which is in fluid communication with said second layer;
  providing a third layer of particle size fraction on top of said second layer;
  controlling the moisture level of the second layer by delivering or removing liquid to/from the water control basin, whereby a moisture level of the third layer is controlled by utilization of capillary forces in the second layer.

With this aspect of the invention, similar advantages and preferred features are present as in the previously discussed first aspect of the invention, and vice versa, meaning that advantages and preferred features that have been discussed in the foregoing and are to be discussed in the following are present in both aspects of the invention.

According to one exemplary embodiment, the step of applying a porous second layer further comprises the steps of:
  providing a first mixture of cement and particulate material;
  mixing said first mixture with a predetermined amount of water for forming a second mixture;
  applying a layer of said second mixture on top of the first layer;
  curing/setting said layer of said second mixture applied on top of the first layer.

These and other features of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Figure 1:
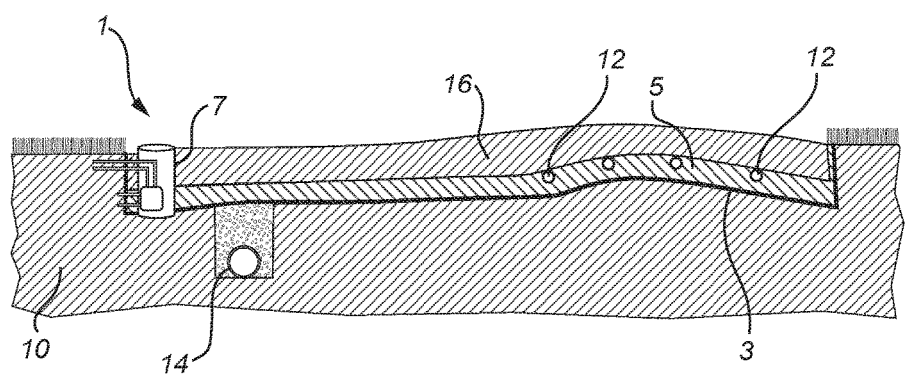
FIG. 1 illustrates a schematic overview of an irrigation system in accordance with an embodiment of the present invention.

In FIG. 1, a schematic illustration of an irrigation system 1, installed in a recess or excavation in a surface area, such as e.g. a golf-green or a lawn. The irrigation system comprises a substantially water impermeable layer 3, such as e.g. a plastic sheet, rubber sheet or any equivalent layer or membrane of material, installed on compacted subgrade 10. Further, depending on the climate of the location where the irrigation system 1 is intended to be installed an insulation layer (35 in FIG. 3) may be provided below and/or around the water impermeable layer 3. Further, a porous layer 5 is provided on top of the water impermeable layer/membrane 3. In one exemplary embodiment, the porous layer 3 is (concrete) mixture comprising cement and particulate stone material, such as e.g. Capillary Concrete™, which is commercially available by the present applicant, Capillary Concrete AB. The irrigation system may also be used at horsing arenas or grounds, e.g. equestrian facilities or horse racing arenas where it may be desirable to accurately control the moisture content of the soil/sand.

In the exemplary embodiment where the porous layer 5 is a mixture comprising cement, the cement may be hydraulic cement. This is advantageous, since during curing, hydraulic cements harden because of hydration chemical reactions that occur independently of the mixture's water content, and they can therefore harden even underwater or when constantly exposed to wet weather. As an alternative the cement may be a Portland cement or blended cement.

FIG. 1 further shows a water control basin 7 which is positioned at the peripheral edge of the recess or depression in the compacted subgrade 10. The water control basin 7 may alternatively be placed anywhere within the depression or recess depending on the intended application. The water control basin 7 is intended to be used for controlling the moisture level of the porous layer 5 and consequently the moisture level of the above soil/sand layer 16. The water control basin 7 may comprise an opening (e.g. ref. 20 in FIG. 2) towards the porous layer 5 which allows a portion of the porous layer 5 to be in direct contact with a volume of liquid (e.g. water) contained by the water control basin. Accordingly, the moisture level of the porous layer 5 will depend on the amount of liquid which is in contact with the portion of the porous layer 5, i.e. the water level. This exemplary embodiment and the features of the water control basin 7 will be explained in more detail in reference to FIGS. 2-3.

Further, a set of drip lines 12 are illustrated in the irrigation system 1 of FIG. 1. As can be seen the drip lines 12 are located at a higher ground level or at an elevation (may also be referred to as a crest or hump) of the underlying surface of the recess. This is in order to ensure that the area/volume above the elevation is irrigated since in some instances the capillary forces transporting the liquid from the water control basin may not overcome the gravitational force in order to irrigate the area/volume above the elevation. The figure also illustrates a drain pipe 14 situated below the water impermeable layer 3 in order to ensure proper draining of the compacted subgrade 10. The subsurface drainage 14 in the subgrade is there only in case of excessively wet ground conditions which results in a need to lower the ground water level below the construction. The irrigation system 1 may comprise one or several drain pipes 14, depending on the intended application. A preferred drainage system is of gravitational type, which is often the most economical to handle heavy rainfalls with no standing surface water, the excess water can be lead to a field reservoir which can be the same as the source used to add water to the water control basin 7, thus enabling recycling of water.

Figure 2:
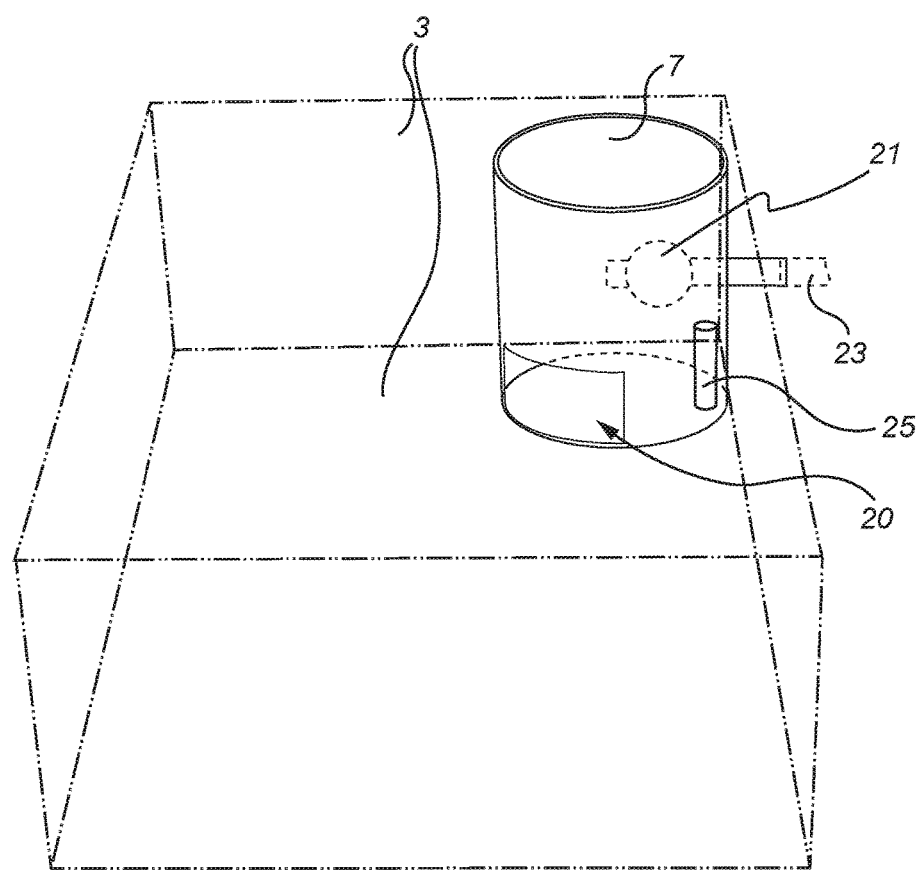
FIG. 2 illustrates a schematic overview of a water control basin positioned within a water impermeable layer in accordance with another embodiment of the present invention.

FIG. 2 illustrates a schematic overview of a water control basin 7 from a perspective view in accordance with an embodiment of the present invention. The water control basin 7 is positioned within a recess or depression in the ground which has been covered with a layer of water impermeable material 3, such as e.g. polyethylene sheets or any equivalent material as known in the art. The water control basin 7 further comprises a pump 21 for adding and/or removing liquid to and from the water control basin 7. The pump is further connected to a pipe 23 which is connected to a remote reservoir. Even though that only one pump 21 and one pipe 23 is illustrated in the figure, it is merely used to elucidate the inventive concept and not to be considered limiting to the invention. There may be a plurality of pumps 21 and pipes 23, each with a specific objective in the system, e.g. adding of liquid, removal of liquid, adding of fertilizer, drainage, etc. Further, a water level or humidity sensor 25 is schematically illustrated in the figure.

Even further, an opening 20 in the water control basin 7 is shown. The opening 20 is intended to be used to create a direct contact between liquid contained in the water control basin 7 and the porous layer 5 (not shown in FIG. 2, see FIG. 1 or FIG. 3), the porous layer is to be placed in such a way that the opening 20 is fully covered without having any substantial portion of the porous layer 5 poking into the water basin through the hole 20 when the system is installed, the porous layer 5 is omitted from FIG. 2 in order to illustrate the exemplary embodiment where the water basin 7 comprises an opening 20 in a clearer manner. Furthermore, the porous layer 5 is intended to cover up the opening 20 in such a way that there can be no substantial leakage of liquid through the periphery of the hole 20.

Figure 3:
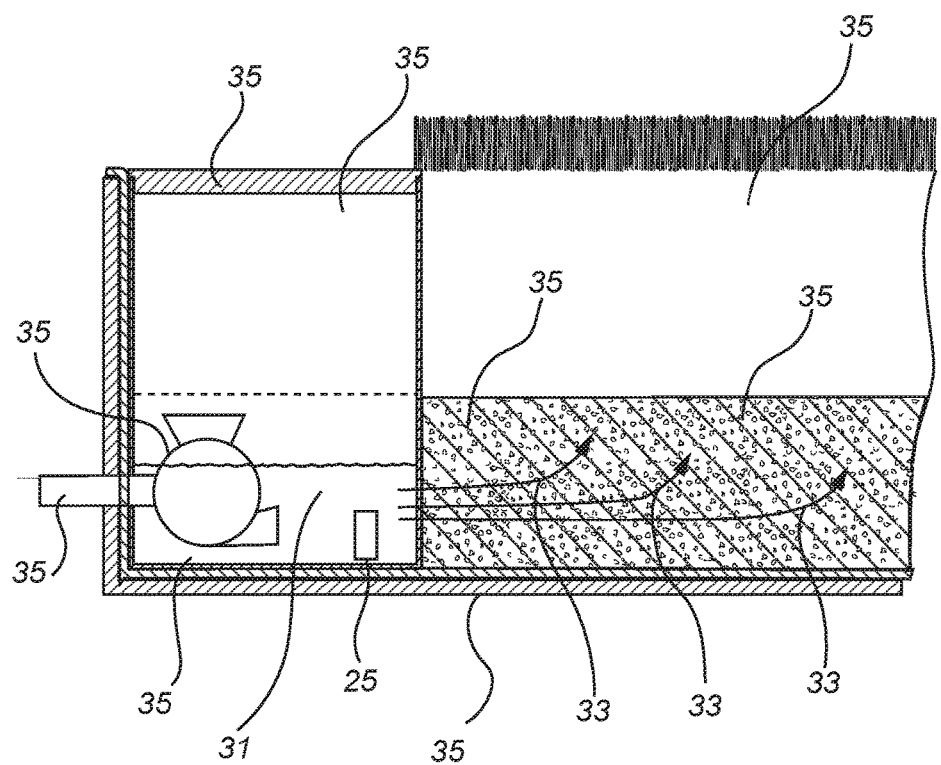
FIG. 3 illustrates a schematic cross-sectional partial view of an irrigation system in accordance with another embodiment of the present invention.

FIG. 3 illustrates a partial cross-sectional view of an irrigation system in accordance with an embodiment of the invention. In this figure the water control basin 7 contains a liquid 31, e.g. water, indicated by the wavy line, also one can also see the intended functionality of the opening 20 in the water control basin 7. The liquid 31 is in direct contact with a portion of the porous layer 5, thus enabling easy transport of water throughout the entire volume of the porous layer, and subsequently to the above soil 16 or sand 16 through the use of capillary forces, as indicted by arrows 33. By keeping the water level (water level is used as a general term of expressing the amount of liquid contained by the water control basin in reference to the surface of the liquid and its position) constant, e.g. by controlling the pump 21 based on sensor 25 input, the moisture level in the porous layer 5 will after an amount of time reach an equilibrium, depending on the needs to the above vegetation. Further, the porous layer 5 may be kept constantly moist which is beneficial for vegetative growth and health.

Consequently, raising the water level and keeping it at a high level will increase the moisture level of the porous layer and thus increase the amount of liquid 31 delivered to the above vegetation. Similarly, a low water level will decrease the moisture level and thus the amount of liquid delivered to the above vegetation. The inventive system enables very precise control of the moisture level in the particle size fraction 16 (or also called rooting medium 16 in this context) surrounding the root system of various plants and vegetation.

Alternatively the water control basin 7 does not have an opening 20 but instead the moisture level of the porous layer 5 is controlled by soaking it with liquid by spraying directly on it from e.g. a suitably placed nozzle or jet (not shown) below ground. The nozzle or jet may for example be protruding from the water control basin 7. The water control basin 7 can still be used to house a pump for the nozzle or jet and will still allow the feature of easy access for maintenance.

Figure 4:
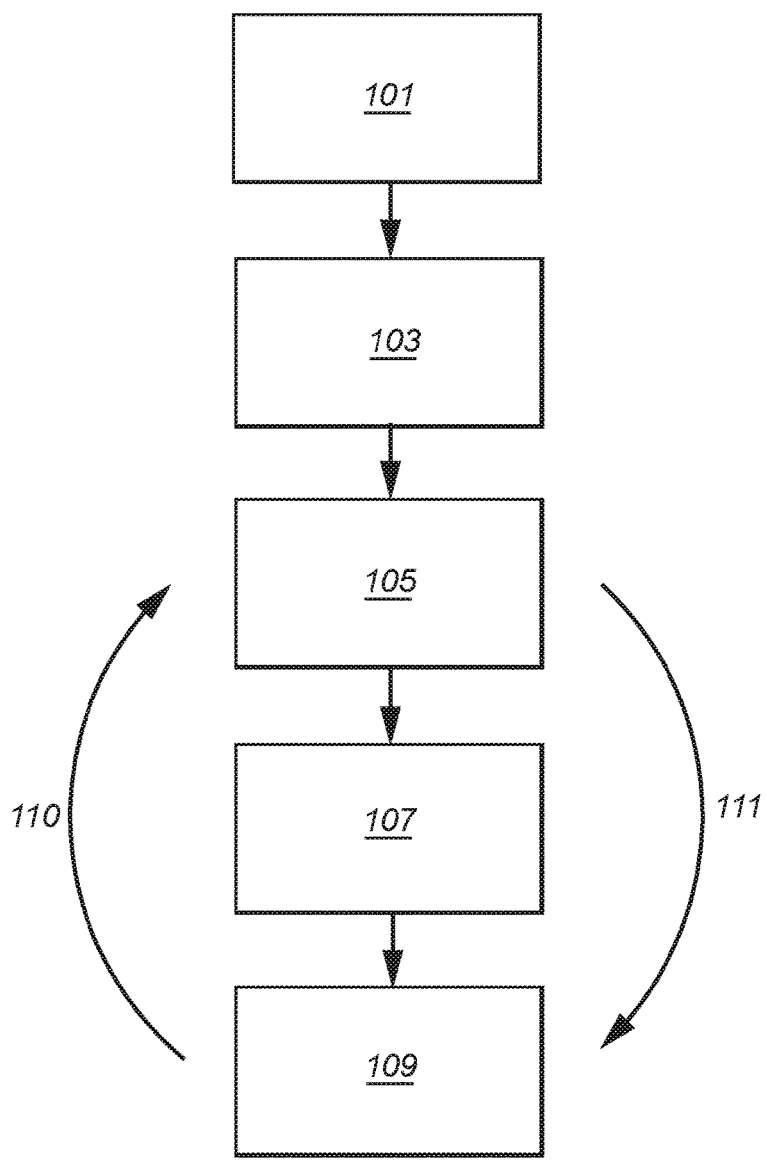
FIG. 4 illustrates a flow chart for providing a sub-surface irrigation system in accordance with yet another embodiment of the present invention.

FIG. 4 illustrates a flow chart describing a method for providing a sub-surface irrigation system in accordance with an embodiment of the invention. In a first step a substantially water impermeable first layer 3 is provided 101. Next, a porous second layer 5 is applied 103 on top of the first layer 3. A water control basin 7 is also provided 105. The water control basin 7 can be placed before or after the application of the porous second layer 5 depending on intended application and needs. Next the porous layer 5 is covered 107 with a layer of particle size fraction (e.g. soil or sand) which can be provided with vegetation, e.g. grass. Controlling 109 of the moisture level of the porous layer 5 (and consequently the irrigation of the above vegetation) may be done by controlling the amount of liquid present in the water control basin 7, this is for example applicable when the porous layer 5 is in direct contact with the contained liquid as described in reference to FIG. 3. The moisture level is then effectively controlled by adding liquid 110 or removing liquid 111 to/from the water control basin 7.

The present invention has here been disclosed in relation to grass covered surfaces, such as sport areas, where it is considered to be particularly advantageous. However, it may also be implemented and used on other planted surfaces, and in particular for irrigation of crops and plantations.

The invention has now been described with reference to specific embodiments. However, several variations of the irrigation system are feasible. For example, a larger surface area may comprise several irrigation systems according to the invention and where all of them are controlled and monitored from the same location. Further, the irrigation may be fully automatic based on input from sensors and gauges or it may be fully manual, i.e. the liquid is added and removed manually from the water control basin, depended on the particular situation and needs. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. An irrigation system for controlling a moisture content below a surface area, said system being installable in a recess above which said surface area will be located, wherein said system comprises:
    a substantially water impermeable first layer for preventing water from escaping a volume defined by the recess;
    a porous second layer being spread out on top of the first layer;
    the porous second layer is a mixture comprising cement and particulate material;
    a water control basin;
    wherein liquid from the water control basin is enabled to be transported through said second layer by capillary forces towards a third layer of rooting medium located directly on top of said second layer.

2. The irrigation system according to claim 1, wherein said particulate material comprises natural stone.

3. The irrigation system according to claim 1, wherein said particulate material comprises crushed aggregate.

4. The irrigation system according to claim 1, wherein said particulate material comprises clay aggregate.

5. The irrigation system according claim 1, wherein said water control basin comprises a pump for addition and/or removal of liquid in said water control basin.

6. The irrigation system according claim 1, wherein at least one portion of said porous second layer is in fluid communication with a liquid present in said water control basin.

7. The irrigation system according to claim 1, wherein said water control basin is located at a peripheral edge of the recess and adjacent to a side-wall of said recess, said side-wall being covered with said water-impermeable first layer.

8. The irrigation system according to claim 1, wherein said water control basin comprises an opening accessible from a surface level.

9. The irrigation system according to claim 8, wherein said water control basin comprises an air-tight seal to said opening.

10. The irrigation system according claim 1, wherein at least one portion of said porous second layer further comprises at least one drip line.

11. The irrigation system according to claim 10, wherein said at least one portion is at least one first portion located at a vertically higher level than at least one second portion of said porous second layer.

12. A method for providing a sub-surface irrigation system, said method comprising the steps of:
    providing a substantially water impermeable first layer;
    applying a porous second layer on top of the first layer;
        the porous second layer applied by:
            providing a first mixture of cement and particulate material;
            mixing said first mixture with a predetermined amount of water for forming a second mixture;
            applying a layer of said second mixture on top of the first layer; and curing/setting said layer of said second mixture applied on top of the first layer;
providing a water control basin;
providing a third layer of particle size fraction directly on top of said second layer;
controlling the moisture level of the second layer by adding or removing liquid to/from the water control basin, whereby a moisture level of the third layer is controlled by utilization of capillary forces in the second layer.

* * * * *